United States Patent
Glatfelter et al.

(10) Patent No.: US 11,752,916 B2
(45) Date of Patent: Sep. 12, 2023

(54) POD-CENTRIC MODULE INTEGRATION WITH A VEHICLE

(71) Applicant: The Boeing Company, Chicago, IL (US)

(72) Inventors: John William Glatfelter, Kennett Square, PA (US); Brian Dale Laughlin, Wichita, KS (US)

(73) Assignee: THE BOEING COMPANY, Arlington, VA (US)

( * ) Notice: Subject to any disclaimer, the term of this patent is extended or adjusted under 35 U.S.C. 154(b) by 1121 days.

(21) Appl. No.: 16/444,309

(22) Filed: Jun. 18, 2019

(65) Prior Publication Data

US 2020/0398731 A1 Dec. 24, 2020

(51) Int. Cl.
| | | |
|---|---|---|
| *B60F 5/02* | (2006.01) | |
| *B64C 37/00* | (2006.01) | |
| *B60P 3/32* | (2006.01) | |
| *B64D 11/00* | (2006.01) | |
| *B64D 13/08* | (2006.01) | |
| *B60H 1/00* | (2006.01) | |

(Continued)

(52) U.S. Cl.
CPC .................. *B60P 3/32* (2013.01); *B60F 5/02* (2013.01); *B60H 1/00207* (2013.01); *B62D 31/025* (2013.01); *B64C 1/22* (2013.01); *B64C 37/00* (2013.01); *B64D 11/00* (2013.01); *B64D 13/08* (2013.01); *B60H 2001/00228* (2013.01); *B64D 2011/0046* (2013.01); *B64D 2013/0603* (2013.01)

(58) Field of Classification Search
CPC .. B60F 3/32; B64C 1/22; B64C 37/00; B62D 31/025
See application file for complete search history.

(56) References Cited

U.S. PATENT DOCUMENTS

| | | | |
|---|---|---|---|
| 2,388,380 A | | 11/1945 | Bathurst |
| 2,462,462 A | * | 2/1949 | Boggs ..................... B64C 37/00 296/193.03 |

(Continued)

FOREIGN PATENT DOCUMENTS

| | | | |
|---|---|---|---|
| KR | 102119424 B1 | * | 6/2020 |
| RU | 144783 U1 | | 8/2014 |

(Continued)

OTHER PUBLICATIONS

Tucker, P., Why Your Plane Can't Have an Escape Pod, Defense One, Nov. 24, 2015, Retrieved from the internet: URL: https://www.defenseone.com/technology/2015/11/why-your-plane-cant-have-escape-pod/123989/ [retrieved on Jan. 31, 2020], pp. 1-5.

(Continued)

*Primary Examiner* — Magdalena Topolski
(74) *Attorney, Agent, or Firm* — COATS & BENNETT, PLLC (57) ABSTRACT

A transportation system that includes one or more pods that include an interior space configured to house one or more travelers. The pods can be attached to and transported by multiple different vehicles. The different vehicles can provide for different modes of transportation. The pods are configured to supply one or more utility functions to the interior space. One or more of the utility functions to be supplied from the vehicles to the pods when the pods are attached to the vehicles.

20 Claims, 11 Drawing Sheets

(51) Int. Cl.
  *B64C 1/22* (2006.01)
  *B62D 31/02* (2006.01)
  *B64D 13/06* (2006.01)

(56) References Cited

U.S. PATENT DOCUMENTS

| | | | | |
|---|---|---|---|---|
| 2,562,491 | A * | 7/1951 | Theodorep | B64C 37/00 |
| | | | | 244/50 |
| 3,101,919 | A | 8/1963 | Madon | |
| 3,291,242 | A * | 12/1966 | Tinajero | B64C 37/00 |
| | | | | 244/114 R |
| 3,423,121 | A | 1/1969 | Lipkin | |
| 3,605,935 | A * | 9/1971 | Gilbert | B60F 1/00 |
| | | | | 296/35.3 |
| 3,767,253 | A | 10/1973 | Kluetsch | |
| 4,143,841 | A * | 3/1979 | Roeder | B64D 25/12 |
| | | | | 244/140 |
| 4,358,072 | A * | 11/1982 | Williamson | B64C 37/00 |
| | | | | 244/234 |
| 4,664,340 | A | 5/1987 | Jackson | |
| 4,676,545 | A * | 6/1987 | Bonfilio | B62D 29/046 |
| | | | | 440/90 |
| 4,699,336 | A | 10/1987 | Diamond | |
| 4,890,083 | A | 12/1989 | Trenkler et al. | |
| 5,065,162 | A | 11/1991 | Akaba et al. | |
| 6,059,058 | A * | 5/2000 | Dower | B60L 50/52 |
| | | | | 180/65.265 |
| 6,382,563 | B1 | 5/2002 | Chiu | |
| 6,392,538 | B1 | 5/2002 | Shere | |
| 6,494,404 | B1 | 12/2002 | Meyer | |
| 6,682,017 | B1 | 1/2004 | Giannakopoulos | |
| 7,344,109 | B1 | 3/2008 | Rezai | |
| 7,946,530 | B1 * | 5/2011 | Talmage, Jr. | B64C 39/02 |
| | | | | 244/140 |
| 9,322,897 | B1 | 4/2016 | Hoffman et al. | |
| 10,207,805 | B2 * | 2/2019 | Evans | B64D 11/00 |
| 10,303,171 | B1 | 5/2019 | Brady et al. | |
| 10,545,509 | B1 | 1/2020 | Jessen et al. | |
| 10,870,479 | B2 * | 12/2020 | Courtin | B64C 39/024 |
| 11,167,848 | B2 * | 11/2021 | Duffy | B64D 9/003 |
| 11,465,545 | B2 * | 10/2022 | Glatfelter | B62D 63/025 |
| 11,548,335 | B2 * | 1/2023 | Stadler | B60L 58/20 |
| 2002/0172571 | A1 | 11/2002 | Lawrence | |
| 2005/0247824 | A1 | 11/2005 | Allison, Sr. | |
| 2006/0079291 | A1 | 4/2006 | Granovetter et al. | |
| 2011/0233341 | A1 | 9/2011 | Monteforte | |
| 2014/0160550 | A1 | 6/2014 | Brown et al. | |
| 2014/0302810 | A1 | 10/2014 | Inha et al. | |
| 2015/0266666 | A1 | 9/2015 | Wong | |
| 2017/0124836 | A1 | 5/2017 | Chung et al. | |
| 2017/0251096 | A1 | 8/2017 | Koepke | |
| 2018/0086353 | A1 | 3/2018 | Holbrooke et al. | |
| 2018/0126871 | A1 * | 5/2018 | Martinotti | B62D 31/025 |
| 2019/0106021 | A1 | 4/2019 | Dietrich et al. | |
| 2019/0271988 | A1 | 9/2019 | High et al. | |
| 2019/0276129 | A1 | 9/2019 | Morgan | |
| 2019/0375505 | A1 | 12/2019 | Bluvband et al. | |
| 2020/0047692 | A1 | 2/2020 | Park et al. | |
| 2020/0180765 | A1 | 6/2020 | Behr et al. | |
| 2021/0183214 | A1 | 6/2021 | Attariani et al. | |

FOREIGN PATENT DOCUMENTS

| | | | |
|---|---|---|---|
| RU | 2706748 C1 * | 11/2019 | |
| UA | 88319 U | 3/2014 | |
| WO | 2020176415 A1 | 9/2020 | |

OTHER PUBLICATIONS

Star Wars, Escape Pod, Retrieved from the internet: URL: https://www.starwars.com/databank/escape-pod [retrieved on Jan. 31, 2020], pp. 1-4.

Tablang, K., "This Intriguing Aircraft Concept Aims to Eliminate Airport Lines and Terminals", ForbesLife, Retrieved from the internet: URL:https://www.forbes.com/sites/kristintablang/2016/07/12/clip-air-concept-ecole-polytechnique-federale-de-lausanne-switzeriand/?sh=7421b65a2283 [retrieved on Jun. 17, 2022], Jul. 12, 2016, pp. 1-6.

* cited by examiner

POD-CENTRIC MODULE INTEGRATION WITH A VEHICLE

TECHNOLOGICAL FIELD

The present disclosure relates generally to the field of transportation and, more specifically, to transportation pods configured to attach to a vehicle.

BACKGROUND

Much of a traveler's time is spent moving from one environment to another. For example, a business traveler that travels from their office to a business meeting in a remote city moves through a number of different environments. This can initially include a first vehicle such as a car or public transportation vehicle to travel from their office to the airport. This can also include the interior of the airport while moving through security and waiting at the airline gate. Another environment includes the one or more aircraft used for traveling to the city where the meeting is located. This can then also include another transportation vehicle to travel from the airport to the meeting.

The traveler is required to physically move into and out of each of these environments during their trip. This includes getting into an out of vehicles, sitting in waiting areas, sitting on the aircraft, moving through security, etc. Further, the traveler is required to closely monitor the time to ensure they are at the correct location at the correct time. This movement and monitoring of time makes it difficult for the traveler to be productive. Further, the required effort can be exhausting to the traveler.

SUMMARY

One aspect is directed to a transportation system to transport one or more persons or objects. The system includes pods that each includes a body that extends around and forms an interior space to house the one or more persons or objects, and a pod control unit that controls one or more utility functions within the pod. The system includes vehicles that are each configured to individually connect to and transport one or more of the pods. At least one of the vehicles is configured to transport the one or more pods by land and at least one of the vehicles is configured to transport the one or more pods by air. The vehicles are configured to provide the one or more utility functions to the pods. Each of the pods is configured to operate in a first mode and a second mode. The first mode includes providing the one or more utility functions to the interior space through the pod control unit without use of any of the vehicles. The second mode includes the pod connected to one of the vehicles and receiving the one or more utility functions from the vehicle.

One aspect is directed to a transportation system to transport one or more persons or objects. The transportation system includes a plurality of pods that each include: a body that extends around and forms an interior space to house the one or more persons, or objects; a pod control unit with a control circuit and a pod communication circuit with the control circuit configured to activate and deactivate the pod communication circuit. The transportation system includes a plurality of vehicles that each includes: a base to receive one or more of the pods; a vehicle control unit operative to control communications to and from the vehicle; and an engine that drives the base. At least one of the vehicles is configured to transport one or more of the pods by land and at least one of the vehicles is configured to transport one or more of the pods by air. Each of the pods is configured to operate in a first mode when detached from the vehicles with communications to and from the pod being sent and received by the pod control unit, and each of the pods is configured to operate in a second mode when attached to one of the vehicles with the communications to and from the pod being sent and received by the vehicle control unit.

One aspect is directed to a method of transportation that includes: attaching a pod to a first vehicle at a first location while an interior space that holds one or more persons, or objects, is in a predetermined or modifiable orientation; transporting the pod and the one or more persons, or objects, with the first vehicle from the first location to a remote second location using a first mode of transportation while the interior space remains in the predetermined or modifiable orientation; while transporting the pod from the first location to the second location, providing one or more utility functions to the pod through the first vehicle; detaching the pod from the first vehicle at the second location while the interior space remains in the predetermined or modifiable orientation; while the pod is detached from the first vehicle, providing the one or more utility functions to the pod through the pod; attaching the pod to a second vehicle at the second location while the interior space remains in the predetermined or modifiable orientation; transporting the pod and the one or more persons, or objects, with the second vehicle from the second location to a remote third location using a different second mode of transportation while the interior space remains in the predetermined or modifiable orientation; and while transporting the pod from the second location to the third location, providing the one or more utility functions to the pod through the second vehicle.

The features, functions and advantages that have been discussed can be achieved independently in various aspects or may be combined in yet other aspects, further details of which can be seen with reference to the following description and the drawings.

DETAILED DESCRIPTION

Figure 1:
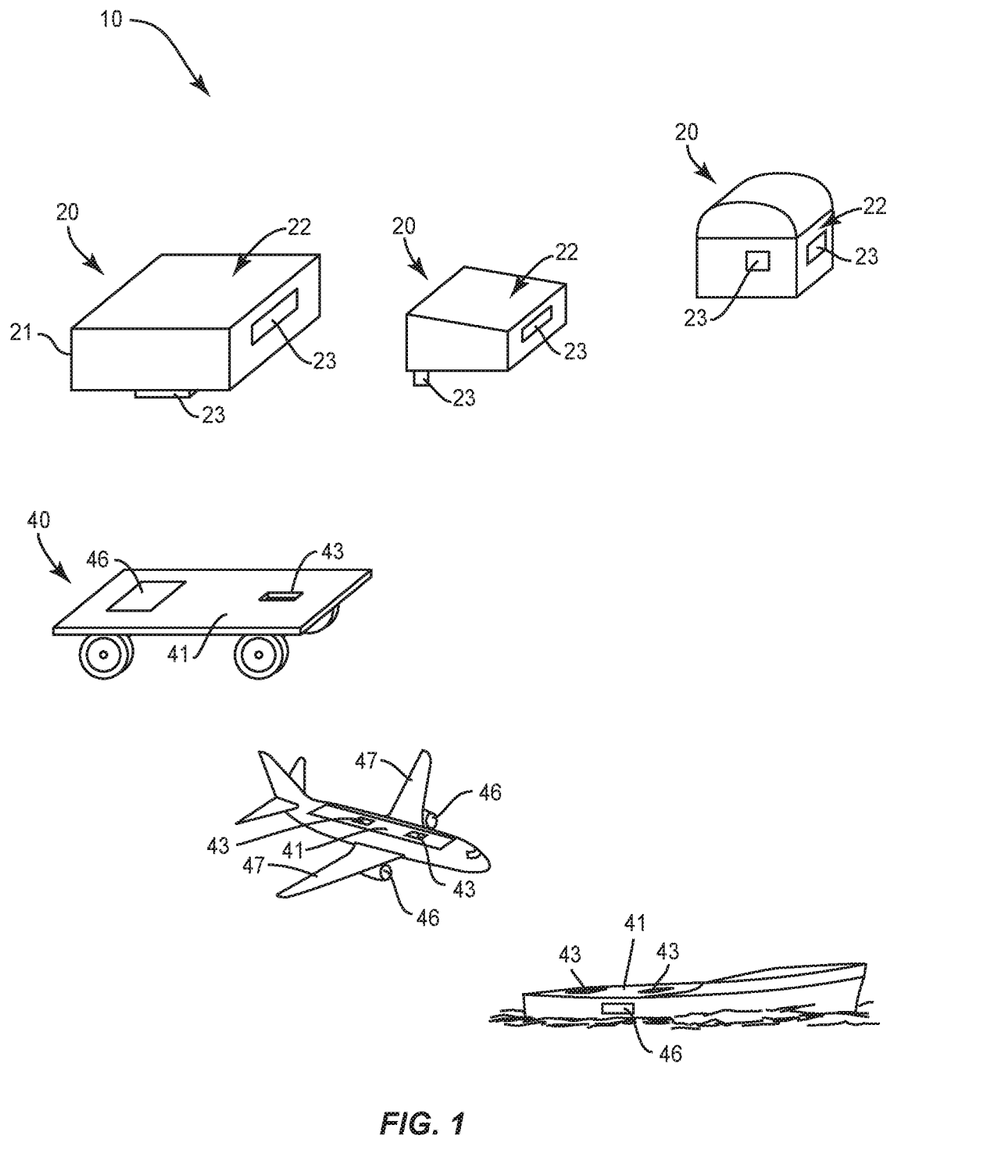
FIG. 1 is a schematic perspective diagram of a transportation system that includes one or more pods and one or more vehicles.

FIG. 1 illustrates a transportation system 10 that includes one or more pods 20. The pods 20 include an interior space 22 configured to house one or more travelers and/or objects. The pods 20 can be attached to and transported by multiple different vehicles 40. The different vehicles 40 can provide for different modes of transportation. Modes of transportation include but are not limited to ground travel, air travel, water travel, and rail travel (e.g., train). The pods 20 are configured to supply one or more utility functions to the interior space 22. Utility functions can include but are not limited to power, communications, and heating/cooling. When the pods 20 are connected to the vehicles 40, one or more of the utility functions can be supplied by the vehicles 40 to the pods 20.

During use, one or more travelers and/or objects are housed within the pod 20. The pod 20 is attached to and transported by one or more vehicles 40 during the travel. For example, the pod 20 can be initially connected to and transported by a land-based vehicle 40 for transportation to an airport. The pod 20 can then be connected to and transported by an air-based vehicle 40 for transportation to a remote destination. During the travel with the two separate vehicles 40, the travelers and/or objects remain within the pod 20 with little to no interruptions that would otherwise occur during the travel.

Figure 2:
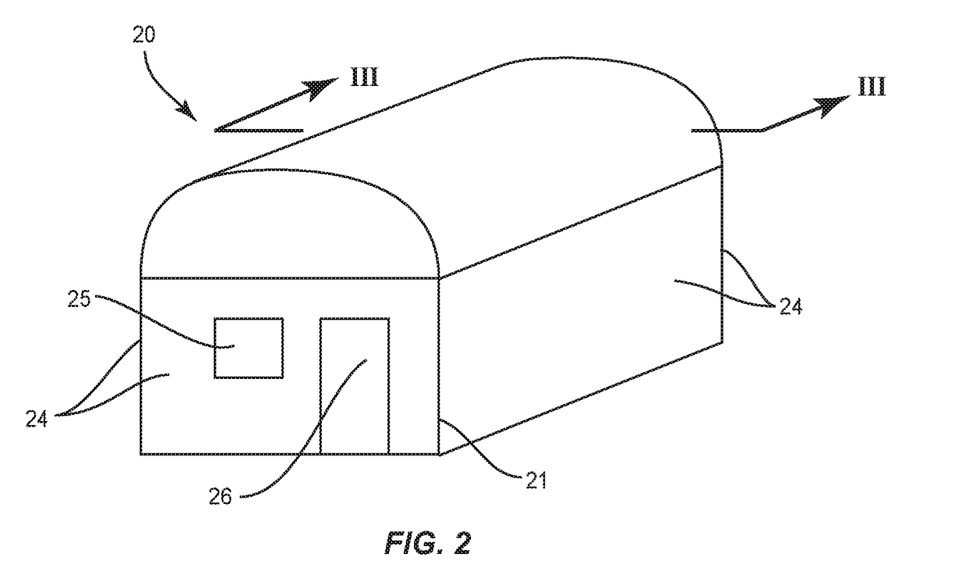
FIG. 2 is a schematic perspective view of an exterior of a pod.

FIG. 2 illustrates a pod 20 that includes a frame 21 that extends around and forms the interior space 22. The frame 21 includes one or more wall segments 24 that can be configured in various shapes and sizes. One or more of the wall segments 24 can be opaque to provide for privacy within the interior space 22. One or more of the wall segments 24 can be translucent to allow light from the exterior to enter into the interior space 22. One or more windows 25 can extend through one or more of the wall segments 24 to allow the travelers to view their environment during travel. One or more doors 26 provide for access into and out of the interior space 22. The windows 25 and doors 26 can be configured to be closed or opened during travel. For example, the windows 25 can be opened to provide air into the interior space 22 during travel on the ocean.

Figure 3:
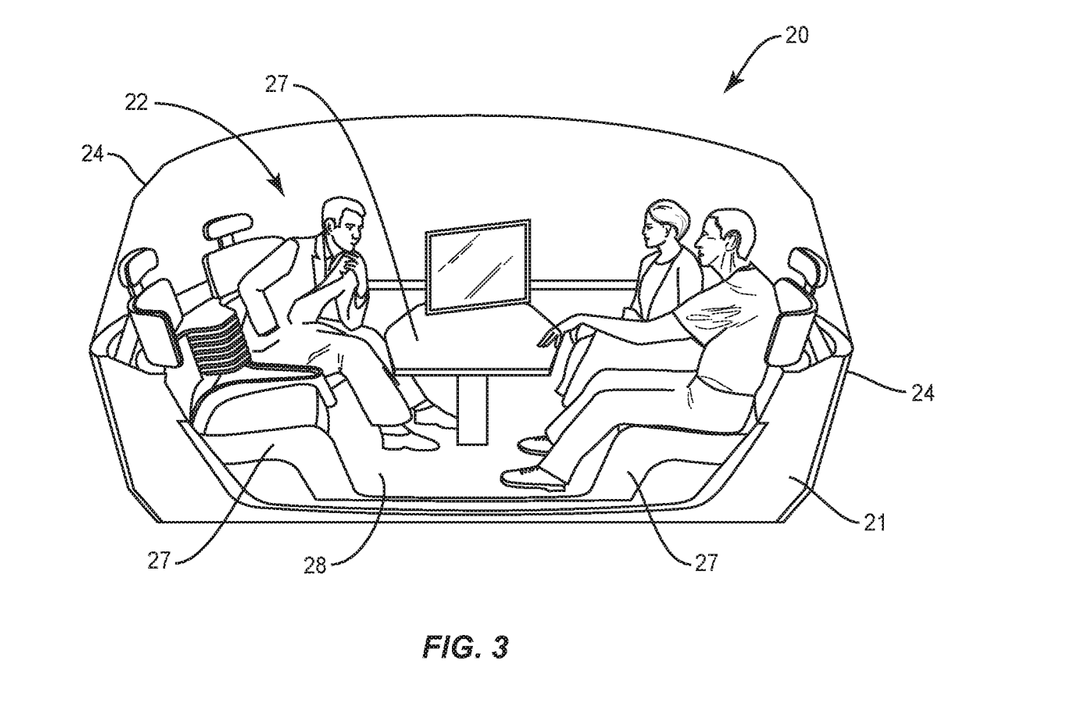
FIG. 3 is a section view cut along line III-III of FIG. 2.

FIG. 3 illustrates an interior space 22 configured as a meeting space. Furniture 27 such as chairs, tables, bookshelves, cabinets, and couches are positioned to facilitate the meeting. In one example, one or more of the pieces of furniture 27 are secured to the floor 28. This provides for the furniture pieces 27 to remain upright during movement of the pod 20. This movement can be caused by various forces, such as but not limited to turbulence during flight or rail travel, wave motion during sea travel, vibrations during land travel, or movement of the pod 20 from one vehicle 40 to another. In one example, one or more of the furniture pieces 27 remain unattached and are freely movable by the travelers around the interior space 22.

The interior space 22 is designed to facilitate the traveler's needs during travel. This can include but is not limited the interior space 22 configured as a meeting space during business travel, a bedroom for overnight travel, various general seating arrangements for business and social travel, as an office with one or more desks, a theater arrangement to watch movies during travel, and various other arrangements.

Figure 4:
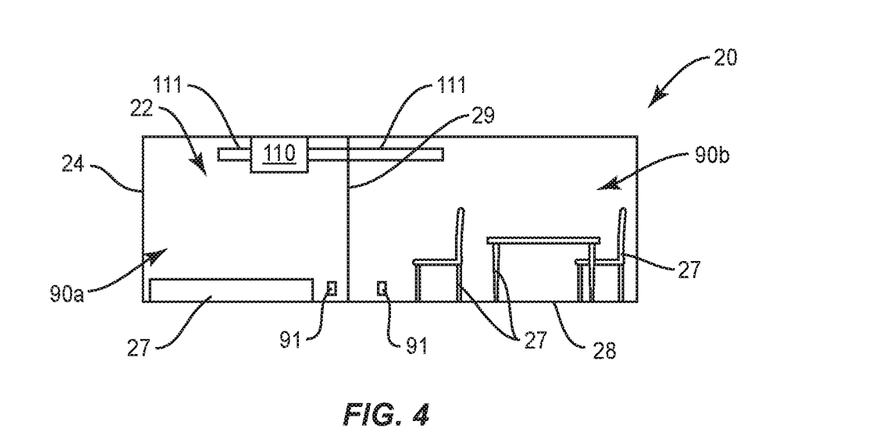
FIG. 4 is a schematic side view of an interior space of a pod.

One or more partitions 29 can also be mounted to divide the interior space 22 into separate compartments 90. FIG. 4 includes a partition 29 dividing the interior space 22 into a first compartment 90a with furniture 27 such as a bed for sleeping, and a second compartment 90b with furniture 27 such as chairs and a table. The partition 29 can be configured to attach to mounts in one or more of the floor 28 and wall segments 24. This provides for the partition 29 to be moved and situated as needed.

Figure 5:
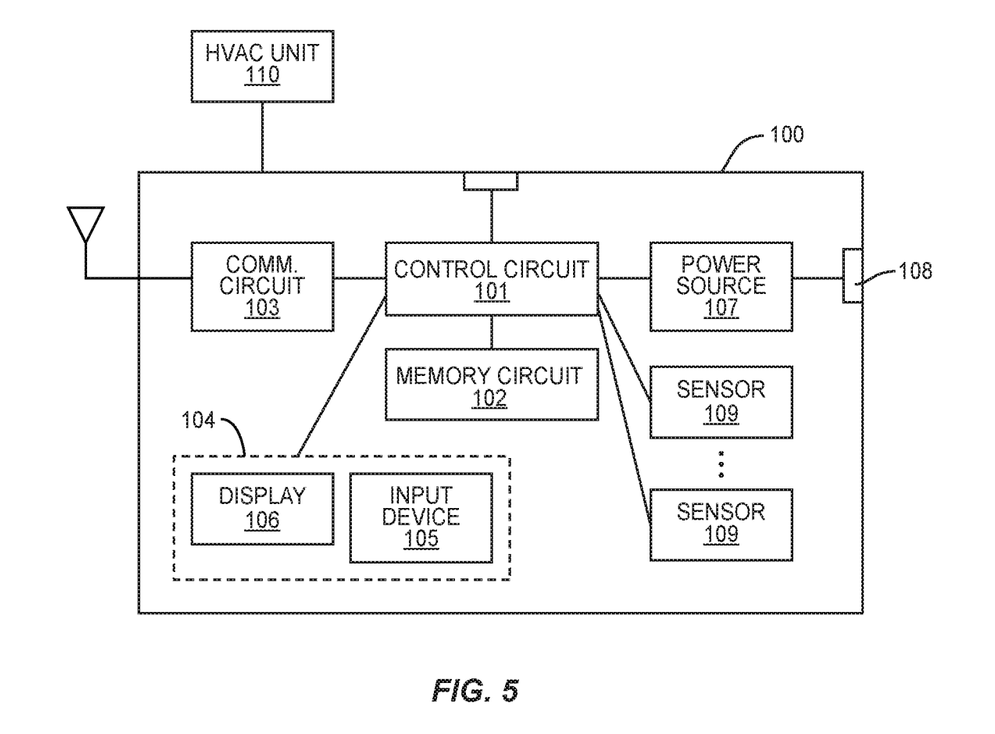
FIG. 5 is a schematic diagram of a control unit for a pod.

The pod 20 includes a control unit 100 as illustrated in FIG. 5. The control unit 100 includes a control circuit 101 and a memory circuit 102. The control circuit 101 controls overall operation of the pod 20 according to program instructions stored in the memory circuit 102. The control circuit 101 can include one or more circuits, microcontrollers, microprocessors, hardware, or a combination thereof. Memory circuit 102 includes a non-transitory computer readable storage medium storing program instructions, such as a computer program product, that configures the control circuit 101 to implement one or more of the techniques discussed herein. Memory circuit 102 can include various memory devices such as, for example, read-only memory, and flash memory. Memory circuit 102 can be a separate component as illustrated in FIG. 5, or can be incorporated with the control circuit 101. Alternatively, the control circuit 101 may omit the memory circuit 102, e.g., according to at least some embodiments in which the control circuit 101 is dedicated and non-programmable.

The control unit 100 is configured to provide for communication functionality for the travelers in the pod 20. Communications can include both incoming and outgoing communications. A communications circuit 103 provides for this communication functionality. The communications circuit 103 enables communication between devices used by the travelers and remote entities over communication networks. The communications circuit 103 can also include one or more devices mounted in the interior space 22 that provide for communications with the remote entities.

The communications circuit 103 can include one or more interfaces that provide for different methods of communication. The communications circuit 103 can include a cellular interface that enables communication with a mobile communication network (e.g., a WCDMA, LTE, or WiMAX network). The communication circuit 103 can include a WLAN interface configured to communicate with a local area network, e.g., via a wireless access point. An exemplary WLAN interface could operate according to the 802.11 family of standards, which is commonly known as a WiFi interface. The communication circuit 103 can further include a personal area network interface, such as a Bluetooth interface. The communication circuit 103 can also include a Near Field Communication interface that provides for short-range wireless connectivity technology that uses magnetic field induction to permit devices to share information with each other over short distances.

In one example as illustrated in FIG. 5, the communications circuit 103 is incorporated into the control unit 100. In another example, the communications circuit 103 is a separate system that is operatively connected to and controlled by the control unit 100.

A user interface 104 provides for a traveler in the pod 20 to control one or more aspects of the pod 20. The user interface 104 can include one or more input devices 105 such as but not limited to a keypad, touchpad, roller ball, and joystick. The one or more input devices 105 provide for the travelers to enter commands to the control circuit 101. The user interface 104 can also include one or more displays 106 for displaying information to the traveler. The user interface 104 can also include a communication device that provides for communicating with the remote entities. The user interface 104 can be positioned within the interior space 22 to be accessible to the travelers during travel.

One or more sensors 109 detect one or more conditions at the pod 20. Aspects that can be detected by the sensors 109 include but are not limited to a temperature within the interior space 22, the position of a door 26 of the pod 20 (i.e., open or closed), and whether the pod 20 is connected to a vehicle 40.

A power source 107 provides power to the control unit 100. The power source 107 can include various configurations, including but not limited to batteries. The power source 107 can also provide power to various components that are within the interior space 22, such as a television or lights. One or more outlets 91 (see FIG. 4) can be positioned in the interior space 22 to supply power to the travelers own components (e.g., laptop computer, phone charger).

One or more solar panels can be mounted on the exterior of the pod 20 and provide recharging to the power source 107. The power source 107 can include a connector 108 to provide a hardwire connection to an external power source (e.g., electrical power from the building in which the pod 20 10 is housed). FIG. 5 includes the power source 107 incorporated with the control unit 100. In another example, the power source 107 can be separate from the control unit 100 and configured to provide power to the control unit 100.

The pod 20 can also include a heating and air conditioning unit (HVAC) 110 to control the air temperature within the interior space 22. The HVAC system 31 can include one or more heating units and cooling units. One or more ducts 111 (see FIG. 4) can extend from the HVAC unit 110 to distribute the conditioned air to the interior space 22. The HVAC unit 110 can be controlled by the control unit 100.

Figure 6:
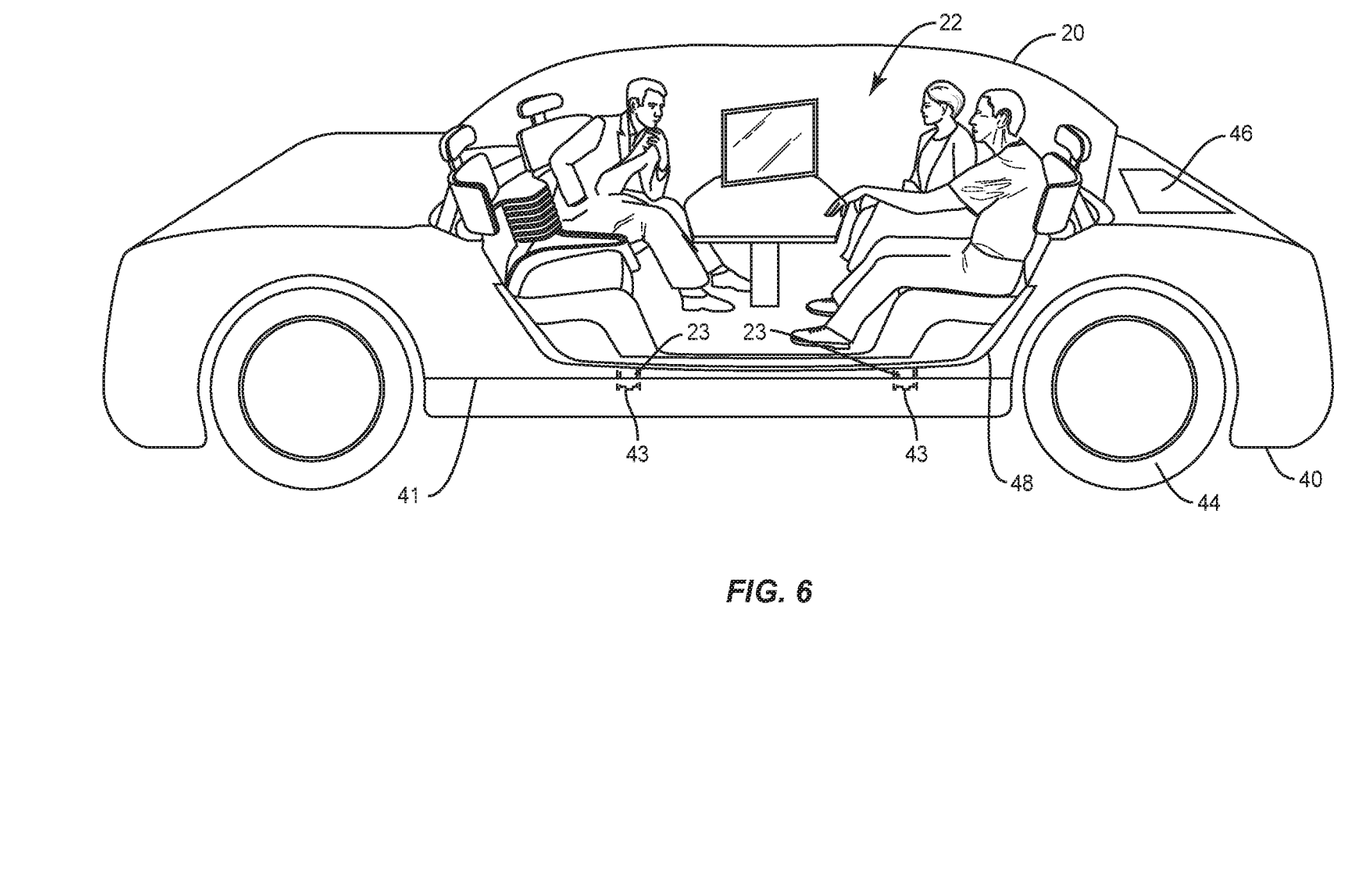
FIG. 6 is a side schematic cut-away view of an interior of a pod that is attached to a vehicle.

Various different types of vehicles 40 can connect to and transport the pod 20. One type of vehicle 40 is configured to transport the pod 20 over land. FIG. 6 illustrates an example of a land-based pod 20 that includes a base 41 that supports the pod 20. The base 41 includes a receptacle 48 that receives the pod 20. The vehicle 40 can also include one or more wheels 44 that are driven by an engine 46 for transportation over land. One or more connectors 43 can be positioned at the base 41 to connect to the pod 20. The connectors 43 can provide for a mechanical connection to prevent detachment when the vehicle 40 is transporting the pod 20.

Figure 7:
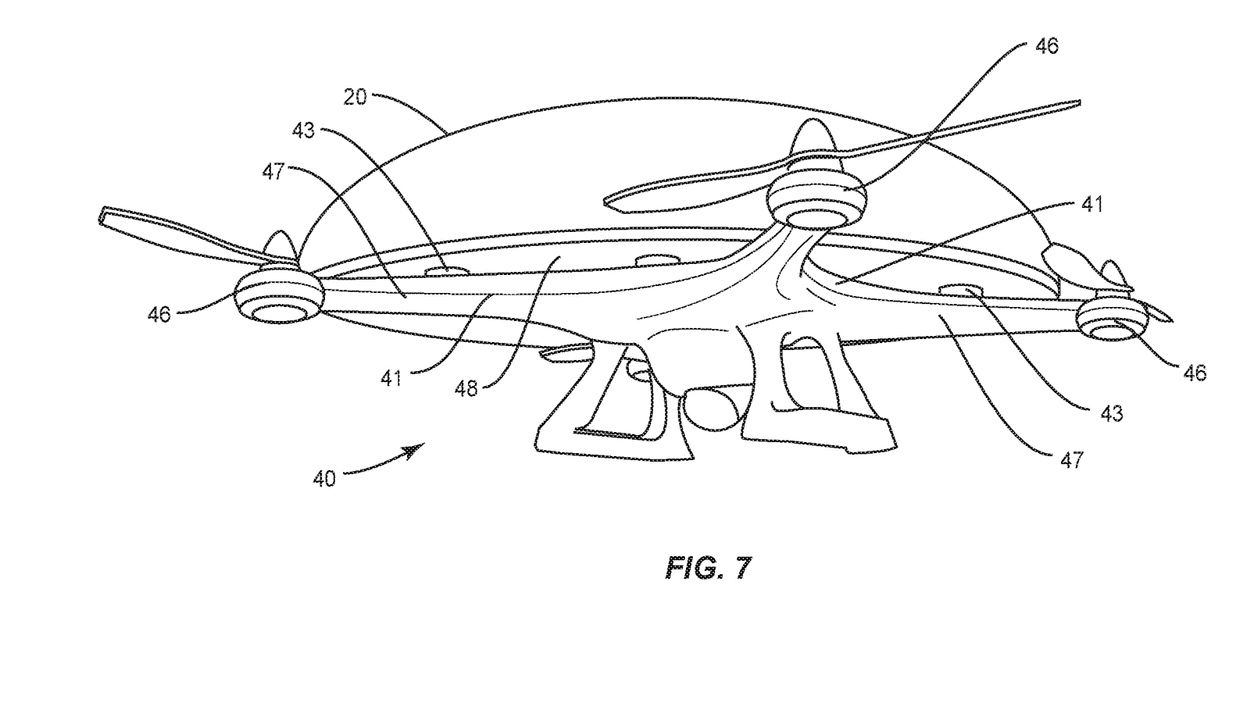
FIG. 7 is a perspective view of a pod connected to a vehicle.

FIG. 7 illustrates a vehicle 40 that provides for air transportation of a pod 20. The vehicle 40 includes a base 41 with a receptacle 48 that receives the pod 20. One or more connectors 43 connect the pod 20 to the base 41. The vehicle 40 also includes wings 47 and engines 46 that provide for flight. A control position 49, such as a cockpit, provides for a pilot to control the transportation. Other vehicles 40 can provide for autonomous transportation and thus may not include a control position 49.

In the various vehicles 40, one or more of the engines 46 can include a propulsion system.

Figure 8:
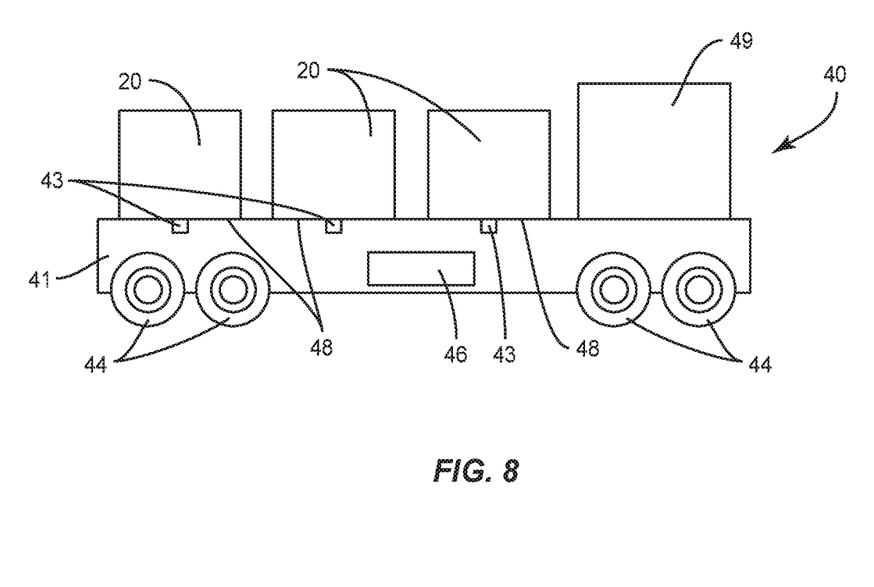
FIG. 8 is a side schematic view of a vehicle configured to attach to and transport multiple pods.

The vehicles 40 can be configured to transport a single pod 20, such as the examples of FIGS. 6 and 7. The vehicles 40 can also be configured to transport multiple pods 20. FIG. 8 includes a vehicle 40 that includes an elongated base 41 with multiple receptacles 48. One or more connectors 43 are positioned at each receptacle 48 to connect the pods 20 to the vehicle 40. The vehicle 40 also includes an engine 46 that drives one or more of the wheels 44 for transportation over land. A control position 49 provides a location for a driver to operate the vehicle 40.

Figure 9:
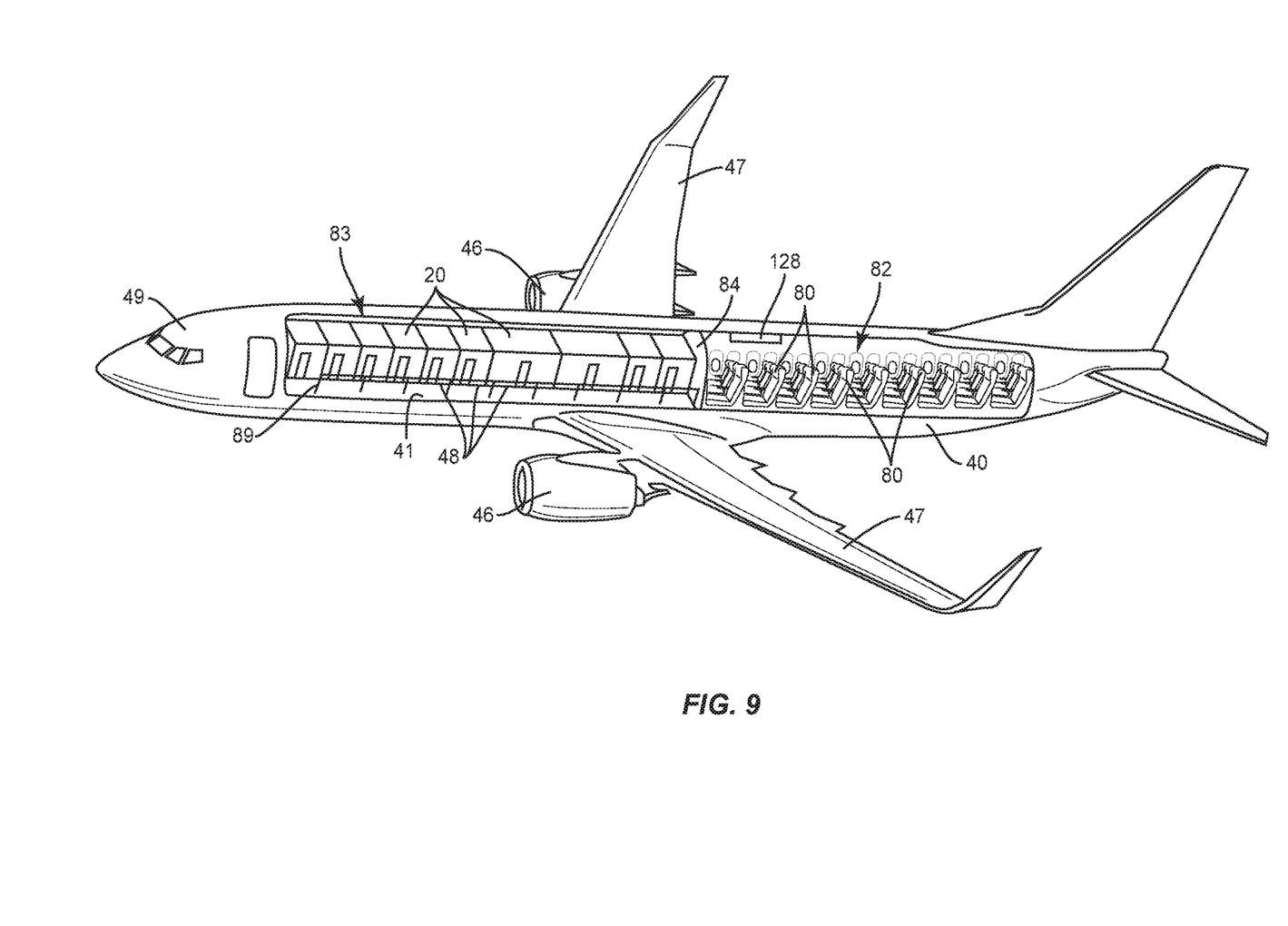
FIG. 9 is a perspective cut away view of a vehicle equipped to transport pods as well as other travelers.

FIG. 9 illustrates a vehicle 40 configured as an aircraft for flight. The vehicle 40 includes a base 41 and wings 47 with one or more engines 46 equipped for flight. The vehicle 40 also includes multiple receptacles 48 each configured to receive one or more pods 20. A control position 49 that includes a cockpit is positioned at the front of the vehicle 40 to control the vehicle 40. The vehicle 40 is equipped with an interior pod section 83 to transport the pods 20. In one design, the pod section 83 is pressurized to allow travelers to exit the pod 20 during flight (such as to use restrooms or a lounge). The vehicle 40 can also include a cabin 82 with one or more seats 80 for transporting persons. The cabin 82 can also include one or more lavatories and a galley. The relative sizes of the pod section 83 and the cabin 82 can vary. FIG. 9 includes an example in which each occupies roughly one-half of the area of the vehicle 40. Other examples can include the sections 83 having various relative dimensions.

Figure 10:
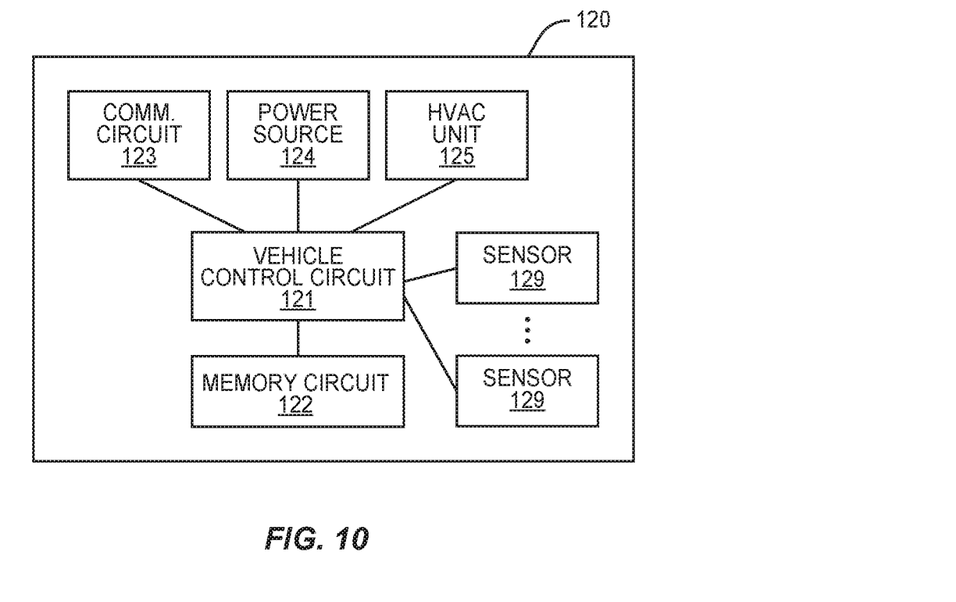
FIG. 10 is a schematic diagram of a control unit for a vehicle.

A vehicle control unit 120 can control one or more operations of the vehicle 40. In one example, the control unit 120 is a flight control unit that controls the operation of an aircraft 40. As illustrated in FIG. 10, the control unit 120 includes a control circuit 121 and a memory circuit 122. The control circuit 121 controls one or more operations of the vehicle 40 according to program instructions stored in the memory circuit 122. The control circuit 101 can include one or more circuits, microcontrollers, microprocessors, hardware, or a combination thereof. Memory circuit 122 includes a non-transitory computer readable storage medium storing program instructions, such as a computer program product, that configures the control circuit 121 to implement one or more of the techniques discussed herein. Memory circuit 122 can include various memory devices such as, for example, read-only memory, and flash memory. Memory circuit 122 can be a separate component, or can be incorporated with the control circuit 121.

A communications circuit 123 provides for communication functionality for the vehicle 40. The communications circuit 123 can provide for different methods of communication, and can include one or more of a cellular interface that enables communication with a mobile communication network, and a WLAN interface configured to communicate with a local area network. In one example, the communications circuit 123 is incorporated into the control unit 120. In another example, the communications circuit 123 is a separate system that is operatively controlled by the control unit 100. The communication circuit 123 can further include a personal area network interface, such as a Bluetooth interface, and a Near Field Communication interface that provides for short-range wireless connectivity technology that uses magnetic field induction to permit devices to share information with each other over short distances.

One or more sensors 129 provide for detecting one or more conditions at the vehicle 40. Conditions include but are not limited to temperature within the vehicle 40, and connection of one or more pods 20.

A power source 124 provides power to the control unit 120 as well as components within the vehicle 40. The power source 124 can include various configurations, including but not limited to batteries. An HVAC unit 125 can provide conditioned air to the vehicle 40. The HVAC unit 125 can include one or more heating units and cooling units as well as one or more ducts 128 to distribute the air. The HVAC unit 125 can be incorporated with the control unit 120 as illustrated in FIG. 10, or can include a separate component that is controlled by the control unit 120.

The pod 20 can function as an independent unit when unattached from a vehicle 40 as well as when attached to a vehicle 40. This independence includes the control unit 100 provide the one or more utility functions. For example, the control unit 100 can provide for communications to and from the pod 20 through the communications circuit 103. The control unit 100 can also provide for heating and cooling the air within the interior space 22 through the HVAC unit 110. The power source 107 can provide electrical power to the components within the interior space 22, including both these that are part of the pod 20 (e.g., lights, video equipment) and those brought into the interior space 22 by the traveler (e.g., cellphone, laptop computer).

Figure 11:
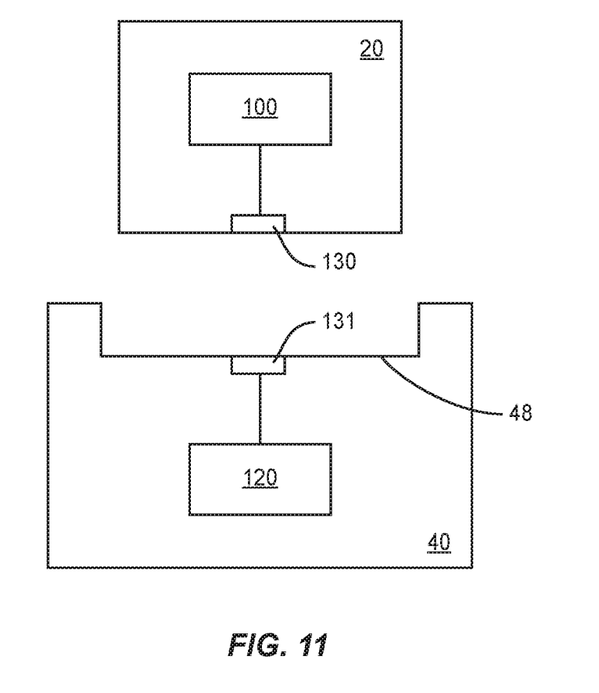
FIG. 11 is a schematic diagram of a pod and vehicle configured to engage together.

The pod 20 can further be configured to receive one or more of the utility functions from the vehicle 40 when attached to the vehicle 40. FIG. 11 illustrates a manner by which the pod 20 can connect to and receive one or more of the utility functions from the vehicle 40. The pod 20 includes a port 130 that is connected to the pod control unit 100. Likewise, the vehicle 40 includes a port 131 that is connected to the vehicle control unit 120. When the pod 20 is connected to the vehicle 40, the ports 130, 131 engage together to provide for one or more of the utility functions to be supplied from the vehicle 40 to the pod 20.

Figure 12:
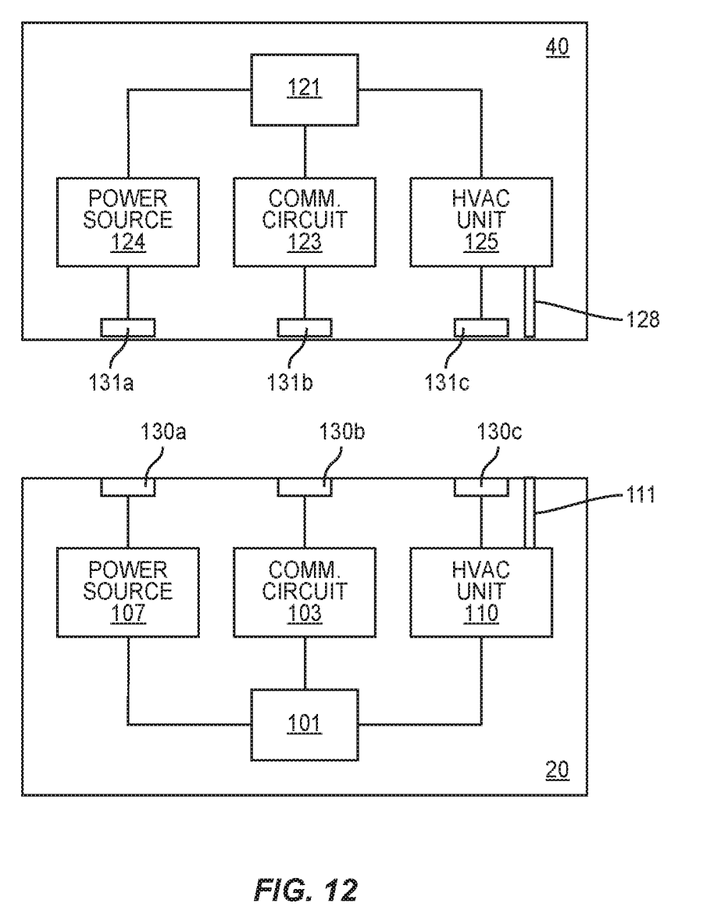
FIG. 12 is a schematic diagram of a pod and vehicle configured to engage together.

The pods 20 and vehicles 40 can also include individual ports 130, 131 for engaging the different utility functions. As illustrated in FIG. 12, the functional utility components 107, 103, 110 on the pod 20 each include ports 130a, 130b, 130c respectively. Likewise, the vehicle functional utility components 124, 123, 125 include ports 131a, 131b, 131c respectively. The ports engage together when the pod 20 is connected to the vehicle 40 to provide the corresponding utility from the vehicle 40 to the pod 20.

In one example, one or more sensors 109 are associated with the ports 130a, 130b, 130c of the pod 20. The sensors 109 provide signals to the control circuit 101 indicating when the ports are connected to a corresponding port on the vehicle 40.

Figure 13:
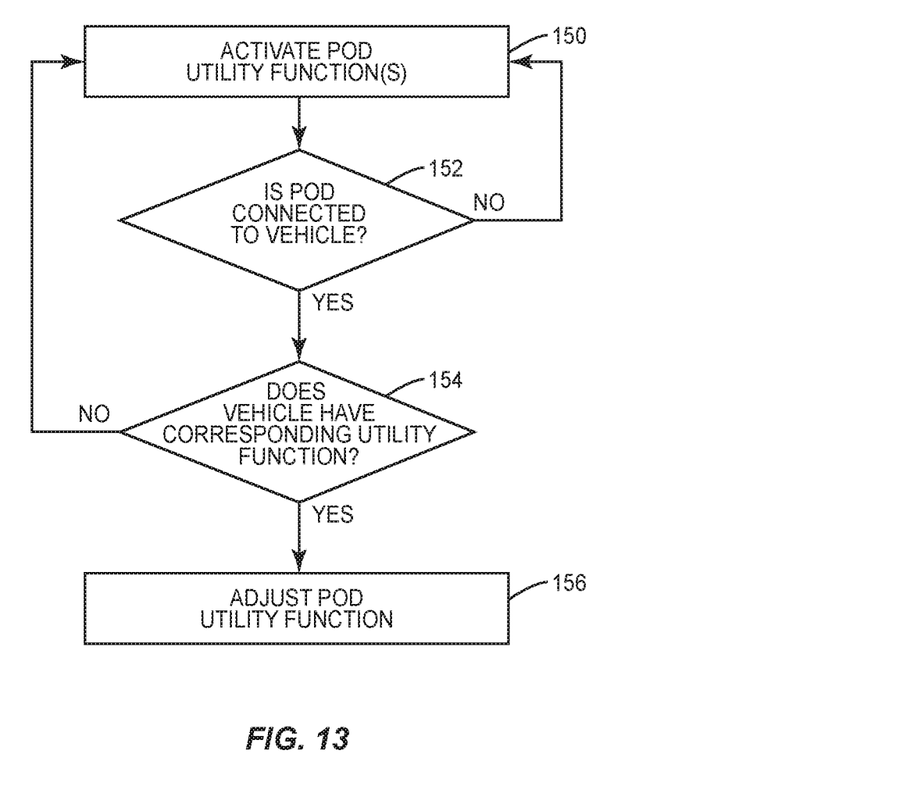
FIG. 13 is a flowchart diagram of a method of supplying one or more functional utilities to a pod.

FIG. 13 illustrates a method of the pod control unit 100 adjusting one or more of the utility functions after the pod 20 is connected to the vehicle 40. Initially, the one or more utility functions on the pod 20 are activated and supply the corresponding function to the pod 20 (block 150). This independent functioning can occur prior to the pod 20 being connected to the vehicle 40.

The control unit 100 can determine whether the pod 20 is connected to a vehicle 40 (block 152). In one example, the connection is determined through signals received from one or more sensors 109, 129 that are positioned to detect the connection. In another example, the connection between the pod 20 and the vehicle 40 can be signaled to the control unit 100 from the vehicle 40. The signaling can be received by the pod 20 over a wireless network or through a wired connection. If the pod 20 is not connected to the vehicle 40, the one or more utility functions for the pod 20 continue to be supplied by the one or more functional components on the pod 20.

If the pod 20 is connected to the vehicle 40, the control unit 100 can determine the one or more functional utilities that can be provided by the vehicle 40 (block 154). This can include vehicle 40 signaling to the pod 20 the utility functions that can be supplied by the vehicle 40 and/or the pod 20 querying the vehicle 40 for the utility functions. If the vehicle 40 does not have a corresponding utility function, the utility function continues to be supplied by the pod 20. For example, if the vehicle 40 does not include communications functionality, the communications for the pod 20 remains through the communications circuit 103.

When a function can be supplied by the vehicle 40, the corresponding function in the pod 20 can be adjusted (block 156). The extent of the adjustment by the pod 20 can vary. In one example, when a functional utility is available from a connected vehicle 40, the pod 20 automatically receives the utility from the vehicle 40. The corresponding pod utility can continue to operate such as in a more limited role or a backup role, or can be completely deactivated. The adjustment of the pod utility function can be made by the pod control unit 100 or the vehicle control unit 120. For example, the HVAC system 125 from the vehicle 40 provides conditioned air to the interior space 22 and the HVAC system 110 on the pod 20 is deactivated. In another example, the power source 124 on the vehicle 40 provides power to the pod 20 and the pod power source 107 is deactivated. In another example, the one or more functional utility components on the pod 20 continue to operate when the pod 20 is attached to the vehicle 40. For example, the output of the HVAC unit 110 can be reduced but still continue to provide conditioned air to the interior space 22 in combination with the HVAC unit 125 from the vehicle 40.

The pod 20 can continue to provide its one or more of its own functional utilities after the pod 20 is connected to the vehicle 40. This can continue for the duration of the travel, or can change at any point during the travel. For example, the pod 20 can continue to provide communication utility to the pod 20 after being connected to the vehicle 40 if the communication circuit 103 is in use for a call between a traveler and a remote source. Once the call is completed, the communication utility is provided by the vehicle 40.

The vehicle 40 can include one or more additional utility functions that are not available through the pod 20. After attachment of the pod 20 to the vehicle 40, the one or more utility functions can be provided to the pod 20. For example, the vehicle 40 can include a communication circuit 123 but the pod 20 does not include its own communication utility. Thus, the pod 20 is not able to support communications when detached from the vehicle 40. Once attached, the pod 20 can be connected to the communication circuit 123 in the vehicle 40 and provide this utility to the travelers.

In determining how the pod 20 receives a given utility function, one or both control units 100, 120 can analyze the different available functional utilities and select one of the options. For example, when the pod 20 is initially connected to the vehicle 40, one or both of the control units 100, 120 can analyze the abilities of the communications circuits 103, 123. The communications circuit 103, 123 that provides the best utility for the traveler will be supplied to the pod 20. For example, the communications circuit 103, 123 selected may be the one with the strongest antenna, available communication protocols, or highest mobility properties. In another example, the HVAC unit 110, 125 selected may be the one with the highest energy efficiency, or with the largest heating or cooling capacity.

The pod 20 can also block one or more utility functions for a period of time. For example, a traveler may wish to have a confidential discussion with another traveler in the interior space 22. To prevent any type of eavesdropping situation, the communications in the interior space 22 are deactivated. This can include deactivating the communication circuit 103 and/or communication circuit 123. The one or more utility functions can be reactivated at a later time. For example, at the end of the confidential discussion. In one example, the traveler can enter a command through the input device 105 to place the pod 20 into this mode of operation.

Figure 14:
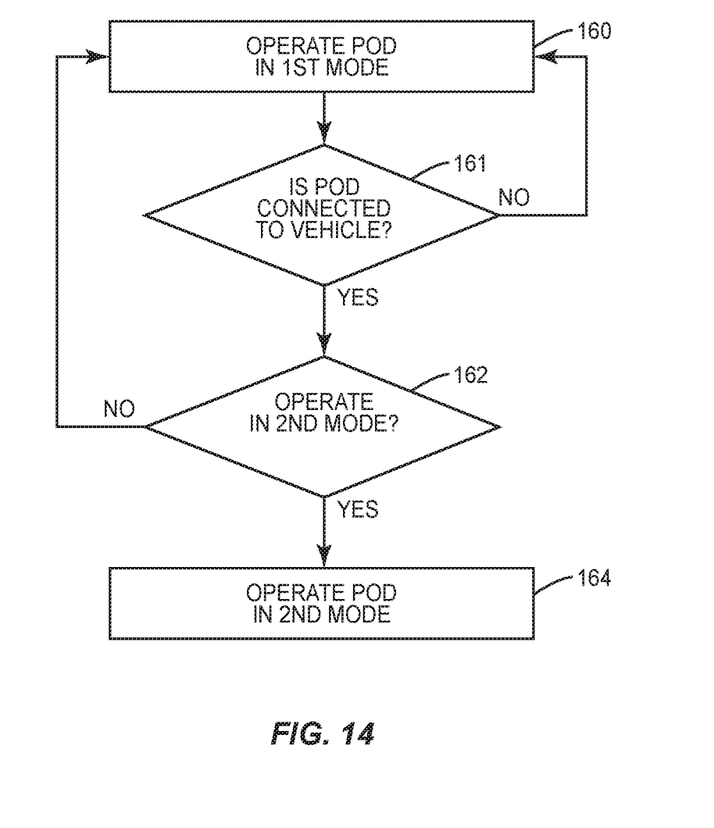
FIG. 14 is a flowchart diagram of a method of supplying one or more functional utilities to a pod.

FIG. 14 is a method of operating a pod 20. The pod 20 can initially operate in a first mode (block 160). This provides for the pod 20 to provide one or more utility functions to the interior space 22. A determination is made as to whether the pod 20 is connected to a vehicle 40 (block 161). If the pod 20 is not connected, the pod 20 continues to operate in the first mode. If the pod 20 is connected to a vehicle 40, the operation of the pod 20 can change to a second mode (block 162). This can include receiving one or more utility functions from the vehicle 40 (block 164).

In one example, the pod 20 automatically changes to the second mode when connected to the vehicle 40. In another example, a determination is made whether to change to the second mode. This can include receiving an input from the traveler. This can also include the control unit 100 analyzing the capability of the vehicle 40 to provide the one or more utility functions. If the vehicle 40 is capable of providing increased functionality, the operation can change to the second mode. In another example, the change to the second mode can occur when the control unit 100 determines that the change is available. For example, a traveler can be using the communication circuit 103 for a call. The change to the second mode may wait until the call is complete to ensure that the call is not inadvertently dropped.

During the transportation, one or more of the control units 100, 120 can monitor the operation of the pod 20. This includes determining the adequacy of the one or more utility functions that are being provided to the pod 20. In one example, one or more sensors 109 provide signals to the control unit 100 and one or more sensors 129 provide signals to the control unit 120 indicative of the status. In the event that a utility function falls below a predetermined level, a mode of operation may change to provide improved functionality. For example, electrical power to the pod 20 can be provided by the power source 107 in the pod 20. After a period of time, the power source 107 may drain to below a predetermined level. Because of this status, a change can be made to the power source 124 from the vehicle 40 to provide power to the pod 20.

The monitoring can also result in one or more utility functions being disabled during time periods of the transportation. For example, communication functionality to the pod 20 that is supplied by one or both of the communications circuits 103, 123 can be disabled during takeoff and landing of an aircraft vehicle 40.

The operation of the pod 20 while connected to a vehicle 40 can be controlled by one or more of the control units 100, 120. For example, the control unit 100 can maintain control over the pod 20 and determine how the one or more utility functions are provided to the pod 20. In another example, the control unit 120 of the vehicle 120 takes control over the pod 20 at the time that the pod 20 is connected to the vehicle 40. In another example, a remote entity, such as a server, oversees and controls the operation of the pod 20 and the manner in which the one or more utility functions are provided to the pod 20.

The pods 20 and vehicles 40 can include a variety of different functional utilities. Examples include but are not limited to power sources, communication system, HVAC systems, and plumbing/water systems.

Transportation using a pod 20 can provide for a traveler to remain within the interior space 22 of the pod 20 during travel. The traveler is not interrupted during the travel and can perform various functions that are supported by the interior space 22. Thus the traveler is not exposed to the difficulties of travel and can be productive during this time.

In one example, the pod 20 can be equipped to support the traveler while they are at the destination. Thus, the traveler can remain with the pod 20. For example, the pod 20 can include a bed to provide for sleeping. The pod 20 can also include a sink, shower, and toilet to allow the traveler to use the pod 20 in the same manner as a hotel room.

As disclosed above, the pods 20 can be configured to transport one or more travelers. The pods 20 can also be configured to transport one or more objects. Examples of objects include but are not limited to traveler luggage, freight, and general cargo. The pods 20 can also be configured to concurrently transport both travelers and objects. For example, the interior space 22 can be arranged for one or more compartments 90 to be equipped to store and transport one or more objects, and one or more other compartments 90 configured to transport one or more travelers.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A transportation system to transport one or more persons, or objects, the system comprising:
a plurality of pods, each of the pods comprising:
a body that extends around and forms an interior space to house the one or more persons or objects;
a pod control unit that controls one or more utility functions within the pod;
a plurality of vehicles each configured to individually connect to and transport one or more of the pods, at least one of the vehicles configured to transport the one or more pods by land and at least one of the vehicles configured to transport the one or more pods by air, the vehicles configured to provide the one or more utility functions to the pods;
each of the pods configured to operate in a first mode and a second mode, the first mode comprising providing the one or more utility functions to the interior space through the pod control unit without use of any of the plurality of vehicles; and
the second mode comprising the pod connected to one of the vehicles and receiving the one or more utility functions from the vehicle.

2. The system of claim 1, wherein the one or more utility functions comprises communication functions and, in the second mode, communications from the pod are initially sent to the connected vehicle and then transmitted from the connected vehicle and the communications to the pod are initially received at the connected vehicle and then transmitted to the pod.

3. The system of claim 1, wherein the pod control unit comprises:
a control circuit;
a pod communication circuit;
the control circuit configured to operate in the first mode when the pod is disconnected from one of the vehicles, and to operate in the second mode when the pod is connected to the connected vehicle.

4. The system of claim 1, further comprising one or more sensors that detect whether the pod is connected to one of the vehicles.

5. The system of claim 1, further comprising a power source mounted to the pod and configured to supply power to the pod when the pod is disconnected from the plurality of vehicles.

6. The system of claim 1, further comprising a display and an input device mounted in the interior space to send and receive communications to and from the pod.

7. The system of claim 1, further comprising a heating and air condition unit (HVAC) mounted to the pod, the pod control unit configured to activate the HVAC unit in the first mod to control a temperature within the interior space e and to deactivate the HVAC unit in the second mode.

8. The system of claim 1, wherein the pod is further configured to operate in a third mode that blocks communications to or from the pod.

9. The system of claim 1, wherein a first one of the vehicles comprises wheels that are driven by a first engine to transport one or more of the pods over land, and a second one of the vehicles comprises a second engine and wings to transport one or more of the pods through the air.

10. The system of claim 1, wherein one or more of the vehicles is configured to concurrently connect to and transport the two or more of the pods.

11. A transportation system to transport one or more persons, or objects, the system comprising:
a plurality of pods each comprising:
a body that extends around and forms an interior space to house the one or more persons, or objects;
a pod control unit comprising:
a control circuit;
a pod communication circuit;
the control circuit configured to activate and deactivate the pod communication circuit;
a plurality of vehicles each comprising:
a base to receive one or more of the pods;
a vehicle control unit operative to control communications to and from the vehicle;
an engine that drives the base;
at least one of the vehicles configured to transport one or more of the pods by land and at least one of the vehicles configured to transport one or more of the pods by air;
each of the pods configured to operate in a first mode when detached from the vehicles with communications to and from the pod being sent and received by the pod control unit; and
each of the pods configured to operate in a second mode when attached to one of the vehicles with the communications to and from the pod being sent and received by the vehicle control unit.

12. The system of claim 11, wherein the control circuit deactivates the pod communication circuit in the second mode.

13. The system of claim 11, further comprising:
ports on each of the pods and vehicles to communicatively connect the pod to the vehicle; and
one or more sensors that detect when the ports are operatively connected together and to signal the pod control unit.

14. The system of claim 11, wherein each of the pods comprises a pod power source to provide power when the pod is detached from the vehicles, and each of the vehicles comprises a vehicle power source to supply power to the pod when the pod is connected to the vehicle.

15. The system of claim 14, further comprising the pod control unit deactivating the power source in the pod when the pod is connected to the vehicle.

16. The system of claim 11, further comprising a heating and air conditioning (HVAC) unit in each of the pods and the pod control unit configured to activate the HVAC unit when the pod is detached from the vehicle to control a temperature within the interior space and to deactivate the HVAC unit when the pod is connected to the vehicle.

17. A method of transportation comprising:
attaching a pod to a first vehicle at a first location while an interior space that holds one or more persons, or objects, is in a predetermined or modifiable orientation;
transporting the pod and the one or more persons, or objects, with the first vehicle from the first location to a remote second location using a first mode of transportation while the interior space remains in the predetermined or modifiable orientation;
while transporting the pod from the first location to the second location, providing one or more utility functions to the pod through the first vehicle;
detaching the pod from the first vehicle at the second location while the interior space remains in the predetermined or modifiable orientation;
while the pod is detached from the first vehicle, providing the one or more utility functions to the pod through the pod;
attaching the pod to a second vehicle at the second location while the interior space remains in the predetermined or modifiable orientation;
transporting the pod and the one or more persons, or objects, with the second vehicle from the second location to a remote third location using a different second mode of transportation while the interior space remains in the predetermined or modifiable orientation; and
while transporting the pod from the second location to the third location, providing the one or more utility functions to the pod through the second vehicle.

18. The method of claim 17, further comprising heating or cooling the interior space through a heating and air condition unit on the pod while the pod is detached from the first vehicle and the second vehicle, and heating or cooling the interior space through the first vehicle when transporting the pod from the first location to the second location, and heating or cooling the interior space through the second vehicle when transporting the pod from the second location to the third location.

19. The method of claim 17, further comprising transporting the pod on the ground with one of the first and second vehicles and transporting the pod in the air with the other of the first and second vehicles.

20. The method of claim 17, further comprising attaching one or more additional pods to the first vehicle and transporting the pod and the additional pods from the first location to the remote second location using the first mode of transportation.

* * * * *